United States Patent [19]

Albers

[11] Patent Number: 4,501,832

[45] Date of Patent: Feb. 26, 1985

[54] WATER-REDUCIBLE EPOXY COATING COMPOSITIONS

[75] Inventor: Richard A. Albers, Irvine, Calif.

[73] Assignee: Deft Chemical Coatings, Inc., Irvine, Calif.

[21] Appl. No.: 375,997

[22] Filed: May 7, 1982

Related U.S. Application Data

[62] Division of Ser. No. 143,916, Apr. 25, 1980, Pat. No. 4,352,898.

[51] Int. Cl.$^3$ .................... C08J 3/08; C08L 63/00; C07D 3/58
[52] U.S. Cl. ..................................... 523/414; 427/386
[58] Field of Search .................... 523/414; 427/386

[56] References Cited

U.S. PATENT DOCUMENTS

| | | | |
|---|---|---|---|
| 3,099,632 | 7/1963 | De Crease | 260/3.3 |
| 3,192,248 | 6/1965 | Bonetti et al. | 260/467 |
| 3,474,056 | 10/1969 | Schneider | 528/117 |
| 3,723,332 | 3/1973 | Barton | 252/171 |
| 3,970,621 | 7/1976 | Kondo et al. | 260/18 |
| 4,066,625 | 1/1978 | Bolger | 528/117 |
| 4,076,676 | 2/1978 | Sommerfeld | 428/416 |
| 4,120,839 | 10/1978 | Emmon et al. | 260/29.2 EP |
| 4,159,976 | 7/1979 | Moran, Jr. | 528/117 |
| 4,179,440 | 12/1979 | Martinez | 260/29.4 R |
| 4,180,166 | 12/1979 | Batdorf et al. | 427/386 |
| 4,182,831 | 1/1980 | Hicks | 260/29.2 EP |

FOREIGN PATENT DOCUMENTS 4878013  6/1980  Japan ................... 528/117

OTHER PUBLICATIONS

NP Division Technical Bulletin, NP Series, TB 36.
Unirez 2510 and 2511 Product Data Sheet Aug., 1977.
Union Camp Corporation Technical Service Bulletin TS-148, p. 478, May 17, 1978.

*Primary Examiner*—Joseph L. Schofer
*Assistant Examiner*—Peter F. Kulkosky
*Attorney, Agent, or Firm*—Jeffrey G. Sheldon

[57] ABSTRACT

A homogeneous, water-reducible coating composition comprises a modified polyamine resin homogeneously reduced in an aqueous system comprising water and a low-molecular weight nitroparaffin. An epoxy resin can be added to the coating composition to form a stable emulsion.

32 Claims, No Drawings

WATER-REDUCIBLE EPOXY COATING COMPOSITIONS

This is a division of application Ser. No. 143,916, filed Apr. 25, 1980, now U.S. Pat. No. 4,352,898.

BACKGROUND

The present invention is directed to water-reducible coating compositions containing a modified polyamine resin and/or epoxy resin.

Organic solvents used in coating compositions have been identified as a contributor to air pollution. Since 1966 legislation and regulations on volatile organic compounds have been directed to limiting the use of organic compounds in coatings. Regulations have been issued to limit the volatile organic content (VOC) of organic coatings to a maximum of 350 grams per liter, where $$VOC = \frac{VOM \times 454}{3.785(1 - W)}$$

where VOM=pounds of volatile organic material per gallon of coating material as applied, and W=the volume of water per gallon in the coating as applied.

The volatile organic material is defined as any volatile compound of carbon, excluding methane, carbon monoxide, carbon dioxide, carbonic acid, metallic carbides or carbonates, ammonium carbonate, methylene chloride, 1,1,1-trichloroethane, and trichlorotrifluoroethane.

In order to achieve low VOC content, much attention is being directed toward waterborne coatings. Advantages of waterborne coatings include reduced air pollution, limited fire and health hazards, and reduced usage of costly organic solvents.

Although a number of waterborne coatings are presently available, none has the high performance properties required to match existing catalyzed, ambient temperature curing, solvent-borne coatings such as two package epoxy coatings. Such high performance properties are vital for protection of metal surfaces on ships, aircraft, trucks, bridges, tanks and the like. Although each high performance coating has numerous unique requirements dictated by its end use, all high performance coatings must be insensitive to water, solvents, and other fluids.

Water sensitivity is largely due to hydrophilic groups present in the polymer binder and/or hydrophilic paint additives. Most water-borne coatings have a preponderance of hydrophilic groups and hence are water sensitive. Solvent and fluid resistance properties are only obtained when the coating binder is highly crosslinked, as is the case with catalyzed systems. Unfortunately, most water-borne, ambient temperature, crosslinked systems such as latexes and water-soluble alkyds and acrylics, have insufficient crosslink densities for high performance applications.

Two component amino-epoxy coating systems have been considered for use in high performance, ambient temperature curing, water-borne coating systems. Because the most suitable epoxy resins and amino functional curing agents are not directly water reducible, various systems have been devised to overcome this technical difficulty.

One system that has been devised uses an emulsified epoxy resin. The epoxy resin is either emulsified by a surfactant type emulsifying agent prior to use or emulsified during catalization by amino-functional curing agents which have been modified to have emulsifying properties. These emulsifier type curing agents are of two types: aminofunctional curing agents which are neutralized by acids to form salts, such as disclosed in U.S. Pat. Nos. 2,899,397 and 4,013,601; and aminofunctional curing agents (generally, special polyamide types) which are chemically modified with hydrophilic ether groups so they can be water reduced and emulsified, such as disclosed in U.S. Pat. Nos. 3,998,771 and 4,179,418.

These emulsified epoxy resins systems suffer from poor water resistance. Curing agents of the salt type remain water sensitive after curing due to residual salt. Curing agents modified with the hydrophilic ether groups remain permanently water sensitive. Furthermore, only low molecular weight curing agents can be used because of the very high viscosities which develop when the high molecular weight curing agents are neutralized.

Curing agents useful in curing epoxy resins preemulsified using surfactant type emulsifiers are disclosed in U.S. Pat. Nos. 4,086,179; 4,104,223; 4,152,285; 3,816,366; and 3,956,208. All of these curing agents are low molecular weight polyamide types specially modified to make them more water compatible by using low molecular weight carboxylic acids and/or hydrophilic polyamines in their makeup. Most have amine values greater than 300. Almost all polyamide type resins with amine values of greater than about 400 are inherently water reducible without modification. The amine value is the number of milligrams of KOH equivalent per free amine groups in a one (1) gram sample of resin. In general, the higher the amine value of the resin the shorter the pot life of the catalyzed mixture and the more brittle the resulting coating film. Because of the high amine value of these modified polyamide type curing agents they have limited utility due to their short pot life.

A different approach to water-borne epoxy coatings is disclosed in U.S. Pat. Nos. 3,719,629 and 3,945,963. These patents disclose systems which are water-reducible acrylic copolymers with pendant amino groups. When catalyzed, these pendant amino groups react with the epoxy resin to form a crosslinked acrylic coating film. Unfortunately, the resulting coatings are not flexible. Also, the films are water and solvent sensitive.

From the foregoing, it is evident that there is a need for a water-borne coating composition that has a long pot life and that produces high performance coatings which have solvent and water resistance, and are durable and flexible.

SUMMARY

The present invention is directed to coating compositions with the above features. The invention is based on the discovery that modified polyamine resins can be homogeneously reduced by water to form aqueous systems comprising large amounts of water i.e., in excess of 50% by weight of the modified polyamine resin, by including a nitroparaffin in the system. This can be accomplished without the use of emulsifiers and other dispersing aids. The nitroparaffin used is $C_nX_{2n+2}$ where n is an integer from 1 to 4 and each X is independently selected from the group consisting of chlorine, hydrogen, or $NO_2$, where at least one but no more than 2 X's are $NO_2$. For example, the nitroparaffin can be nitromethane, nitroethane, 1-nitropropane, 2-nitropropane, 1-nitrobutane, 2-nitrobutane, and combinations thereof. The aqueous system includes nitroparaffin in amount of at least about 2%, and preferably to about 50% by weight of the modified polyamine resin, and more preferably from about 15 to about 25% by weight of the modified polyamine resin.

The coating composition can be provided with or without an organic solvent for the modified polyamine resin. It can be provided in kit form where a first container contains the modified polyamine resin and a second container contains epoxy resin curable by the modified polyamine resin. The nitroparaffin can be included in either the first or second container. An organic solvent for the modified polyamine resin can be included in the first container and an organic solvent for the epoxy resin can be included in the second container. The amount of organic solvent used is limited so that the coating composition as applied has a volatile organic content of no more that 450 grams per liter, and preferably no more than 350 grams per liter. The composition formed by mixing contents of the first and second containers is water reducible, i.e., water can be added to reduce the viscosity of the composition. Water can be included in the container containing the nitroparaffin.

A remarkable feature of using a nitroparaffin to permit a modified polyamine resin to be reduced by water is that unexpectedly, the nitroparaffin permits the epoxy resin to be emulsified. The combination of the modified polyamine resin, nitroparaffin, epoxy resin, and water is stable, has a long pot life, and can be used to form a durable, water and solvent-resistant, high gloss, flexible coating suitable for high performance applications.

Other features and advantages of the present invention will become better understood with reference to the appended claims and following description.

DESCRIPTION

The present invention is directed to water-reducible epoxy coating compositions curable by modified polyamine resin curing agents. The invention is based on the discovery that modified polyamine resins which by themselves are not water reducible or miscible, become homogeneously water reducible when a nitroparaffin is included in the system. Furthermore, it has been discovered that if epoxy resin is added to the above system, it can be homogeneously dispersed or emulsified. Since modified polyamine resins are curing agents for epoxy resins, useful products such as coatings and adhesives can be made from these systems.

By the term "dispersion" there is meant a two-phase system in which one phase, called the dispersed phase, is distributed as small particles through the second phase called the continuous phase. By the term "emulsion" there is meant a two-phase liquid system in which small droplets of one liquid (the internal phase) are immiscible in, and are dispersed uniformly throughout, a second continuous liquid phase (the external phase).

Modified polyamine curing agents suitable for use in the coating compositions include those which inherently are soluble in water and those which inherently are insoluble in water. By the term "inherently insoluble" there is meant a curing agent that is not miscible with water and cannot be homogeneously dispersed, emulsified or otherwise reduced by water without chemical modification and/or adding emulsifiers, dispersing aids and/or acids. It has been determined that merely by adding a nitroparaffin to an aqueous system, a modified polyamine resin curing agent which normally would form a separate phase with water can be homogeneously reduced by water. By the term "reduced by water" there is meant caused to be homogeneously miscible, emulsified, or dispersed.

Modified polyamines useful as curing agents in the coating compositions of the present invention include those prepared by reacting aliphatic and cycloaliphatic polyamines with compounds known to react with the amine group. Curing agents derived from the reaction of polyamines with compounds containing the glycidyl ether group (also known as the epoxy group) or the carboxylic acid group have been found to be particularly useful. The reaction products of polyamines with the glycidyl ether group are known as polyamine-epoxy adducts in the trade and can be prepared using either mono, di, and/or poly glycidyl ether compounds.

Examples of polyamine-monoepoxide adducts are those based on monofunctional aliphatic glycidyl ethers, styrene oxide, pentachlorophenyl glycidyl ether, reaction products of epichlorohydrin and bisphenol A containing phenolic hydroxyls and less than one epoxy group per molecule, and epoxidized olefins from unsaturated fatty acid glycerides with less than one epoxy group per molecule.

Examples of polyamine-diepoxide adducts are those based on the diglycidyl ether of bisphenol A (DGEBA), the diglycidyl ether of 4,4'-isopropylidenedicyclohexanol, diglycidyl ether of hydantoin, diepoxides obtained by epoxidation of aliphatic and/or cyclo-aliphatic polyolefins, and diglycidyl ethers of polyoxyalkylene glycol.

Curing agents which are the reaction products of carboxylic acids and polyamines are known as polyamide resin curing agents or polyamides in the trade. They are usually prepared by condensation of the said component with excess amounts of polyalkylene polyamines, particularly polyethylene-polyamines. These amide type curing agents are classified according to the carboxylic acids and reaction conditions used in their synthesis. More precisely this amide class of curing agents are poly-amino-amides and poly-amino-imidazolines. Poly-amino-imidazolines are derivatives of poly-amino-amides prepared by heating to about 300° C. which causes cyclization, forming the imidazole ring system.

The polyamide curing agents based on carboxylic acid can be classified as follows based on the carboxylic acid component:

1. monocarboxylic acids (also known as amidoamines)
2. polycarboxylic acids
  a. $C_{36}$ dimer acids
  b. dicarboxylic acids (other than $C_{36}$ dimer acids)
  c. tri and poly carboxylic acids
    1. trimerized $C_{18}$ fatty acids
    2. tri and polycarboxylic acids (other than those based on $C_{18}$ fatty acids)

Polyamides based on dicarboxylic acids containing greater than 10 carbon atoms, and particularly those based on $C_{36}$ dicarboxylic acid, are preferred to those based on other dicarboxylic acids such as $C_8$, $C_9$, and $C_{10}$ dicarboxylic acids because $C_8$, $C_9$, and $C_{10}$ dicarboxylic acids are more hydrophilic and are less flexible than dicarboxylic acids having more than 10 carbon atoms. Thus a coating using a polyamide resin curing agent based on $C_{36}$ dicarboxylic acid can have good water resistance and flexibility. Preferably a coating comprising a polyamide resin is based on polyamides resulting from the reaction of polyamines and mono- and polycarboxylic acids, where less than about 75% by weight of the carboxylic acids reacted with the polyamine are dicarboxylic acids having 10 or less carbon atoms.

Particularly valuable poly-amino-amides and poly-amino-imidazolines are based on saturated and/or unsaturated monovalent natural fatty acids; on polymeric, particularly dimeric and copolymeric fatty acids; on dicarboxylic acids obtained by carboxylation of unsaturated monovalent natural fatty acids; and polycarboxylic acids obtained by the addition of di or tricarboxylic acids, or their derivatives, particularly maleic acid anhydrides, to natural unsaturated fatty acids.

Examples of other acids which can be used to form polyamides useful as curing agents in the present invention include the following: palmitic acid, stearic acid, oleic acid, elaidic acid, linoleic acid, linolenic acid, dehydrated castor oil fatty acid, elastearic acid, or their mixtures. The polymeric fatty acids used can be prepared from natural fatty acids having one or more unsaturations by thermal or catalytic polymerization or by copolymerization in the presence of polymerizable compounds, such as styrene or its homologues, cyclopentadiene, and the like. Carboxylation of the unsaturated fatty acids is likewise known and results in the case of oleic acid in a dicarboxylic acid having 19 carbon atoms. Other polycarboxylic acids are those which can be prepared by the addition of di- or tricarboxylic acids or their derivatives, particularly maleic acid anhydride to unsaturated fatty acid, particularly oleic acid.

In addition to the aforementioned poly-amino-amide and poly-amino-imidazoline curing agents, polyepoxide adducts of poly-amino-amides and poly-amino-imidazolines (referred to herein as polyamide epoxy adducts) prepared by the teachings of U.S. Pat. No. 3,474,056, which is incorporated herein by this reference, are useful as curing agents in this invention.

Particularly useful curing agents include Versamid and Genamid polyamide resins and the like reacted with epoxy resin according to the teachings of U.S. Pat. No. 3,474,056. Versamid and Genamid polyamide resins are available from General Mills Corporation.

Preferably the polyamide resin has an amine value of less than about 400. At amine values higher than about 400, a coating composition comprising the polyamide resin can have too short a pot life and the coating films formed are not flexible. Most preferably the amine value of the polyamide resin is from about 150 to about 300. The term "amine value" is defined as the miligrams of KOH which are equivalent to 1 gram of resin.

Preferably the modified polyamine resin is selected from the group consisting of (a) polyamine-epoxy adducts; (b) polyamides resulting from the reaction of polyamines and carboxylic acids selected from the group consisting of monocarboxylic acids, poly-carboxylic acids, and combinations thereof, where less than about 75% by weight of the carboxylic acids reacted with the polyamines are dicarboxylic acids having 10 or less carbon atoms; (c) polyamide-epoxy adducts; and (d) combinations thereof.

The nitroparaffin used in the present invention preferably has a sufficiently low molecular weight to evaporate from the coating at about room temperature. If the nitroparaffin did not evaporate from the coating, it would remain in the coating, thereby reducing performance properties of the coating. Preferably the molecular weight of the nitroparaffin is less than about 150.

The nitroparaffin has the formula $C_nX_{2n+2}$ where n is an integer from 1 to 4 and each X is independently selected from the group consisting of chlorine, hydrogen, and $NO_2$, where at least one but no more than two X's are $NO_2$. Preferably the nitroparaffin is selected from the group consisting of nitromethane, nitroethane, 1-nitropropane, 2-nitropropane, 1-nitrobutane, 2-nitrobutane, and combinations thereof. Other suitable nitroparaffins are 1,3 di-nitropropane and 1-chloronitropropane.

Preferred nitroparaffins are 2-nitropropane and nitroethane. This is because when a coating composition comprising a modified polyamine resin, nitroparaffin, water, and epoxy resin is formed with these two nitroparaffins, pot lives of 4 hours and greater have been achieved. When using 1-nitropropane and/or nitromethane, shorter pot lives in the range of 1 to 1½ hours are achieved.

The coating composition contains sufficient nitroparaffin that the modified polyamine resin can be homogeneously reduced by water to form an aqueous system comprising water in an amount of at least 50% by weight of the modified polyamine resin curing agent. Generally nitroparaffin in an amount of at least 2% by weight of the curing agent is required. As the amount of the nitroparaffin in the composition is increased, the pot life of the composition increases and the particle size of the epoxy resin dispersed in the coating system decreases. Small particle size for the epoxy resins is desirable for stability and to form a uniform, coherent, durable coating. However, at nitroparaffin contents in excess of about 50% by weight of the polyamide resin, little if any increase in pot life and decrease in the epoxy resin particle size occur. Therefore, preferably the nitroparaffin is present in an amount of from about 2 to about 50% by weight of the modified polyamine resin, and more preferably from about 15 to about 25% by weight of the modified polyamine resin.

Not being bound by theory, it is believed that nitroparaffins render modified polyamine resins reducible by water by forming a complex with the modified polyamine resin, the complex allowing the modified polyamine resin to accept water.

Epoxy resins suitable for use in this invention are those which contain more than one epoxide group and which can be cured by means of the aforementioned modified polyamine resin curing agent. In this connection, polyglycidyl ethers of aromatic and aliphatic polyvalent hydroxyl-compounds are commonly used. Some of the more useful types are complex polymeric reaction products of polyhydric phenols with polyfunctional halohydrins and/or glycerol dichlorohydrin.

An important class of epoxy resins useful in the present invention is obtained by reacting trimethanol propane or glycerin with epichlorohydrin. Typical polyhydric phenols used in the preparation of epoxy resins nclude resorcinol and various bisphenols resulting from the condensation of phenol with aldehydes or ketones such as formaldehyde, acetaldehyde, acetone, methyl ethyl ketone and the like. A common epoxy resin is the reaction product of epichlorohydrin and 2,2'-bis(p-hydroxyphenyl)-propane, commonly known as the diglycidyl ether of Bisphenol A (DGEBA). Also, suitable epoxy resins can be prepared as the reaction products of epichlorohydrin and bis(tetra-hydroxyphenyl)-sulfone. The glycidyl ethers of polymeric fatty acids obtained by reacting fatty acids having from 8 to 22 carbon atoms with epichlorohydrin are also commercially available and are suitable epoxide materials. Another subclass of suitable epoxy resins are Novolac resins produced by condensing phenol and an aldehyde in the presence of an acid catalyst and subjecting the reaction product to a condensation reaction with epichlorohydrin. Other suitable epoxy resins for use in the present invention include epoxy resins based on 4,4'-isopropylidenedicyclohexanol, those based on hydantoin, a nitrogen-containing heterocyclic ring, and polyepoxides obtained by epoxidation of aliphatic and/or cyclo-aliphatic polyolefins.

While certain specified epoxy resins which are most readily available have been described, it is understood that other epoxy compounds not specifically mentioned herein are suitable in the present invention. Also it is not essential to select a single epoxy compound. Mixtures of two or more similar and/or different epoxy compounds can be used to attain properties not attainable with a single epoxy compound.

Reactive diluents can also be used in the composition. For example, monoepoxy can be used to reduce the functionality or reactivity of the resin system. Some common monoepoxy diluents are butylglycidylether, diglycidyl ether, allylglycidyl ether, glycidyl acrylate, phenyl glycidyl ether, resorcinol glycidyl ether, and butyl phenol cresyl ether. Also suitable as a monoepoxy diluent is styrene oxide.

Some epoxy resins can be used as reactive diluents for epoxy resins, without lowering the functionality of the resin system. Some such resins are vinyl cyclohexene dioxide, diglycidyl ether of 1,4-butanediol, bis(2,3-epoxycyclopentol)ether, triglycidyl ether of trimethyol propane, and the like which serve to reduce resin viscosity.

Sufficient water is included in the composition to reduce the viscosity of the composition to a level that the composition can easily be applied as a coating to a surface. By use of nitroparaffin in amounts as low as 5 parts nitroparaffin to 100 parts by weight polyamide resin, water in an amount of 500% by weight of the polyamide resin routinely can be added to coating compositions of the present invention. It is possible to add as much water as 1500% by weight of the polyamide resin to coating compositions.

It is possible to use surfactants such as emulsifiers, dispersants, and wetting agents in the composition of the present invention. However, surfactants are not needed for emulsification of the epoxy resin due to the presence of the nitroparaffin. Preferably surfactants are not used because they tend to adversely affect the water resistance of coatings. As used herein, the term "surfactant" refers to an additive which reduces surface tension. Dispersants are surfactants that increase the stability of a suspension of solids in a liquid medium. Emulsifiers are surfactants that modify the surface tension of colloidal droplets and disperse dissimilar materials ordinarily immiscible to produce a stable emulsion. Nitroparrafins are not considered to be surfactants, dispersants, or emulsifiers herein because it is believed that nitroparrafins do not affect the surface tension of any component of the composition of the present invention.

The modified polyamine and epoxy resins can be used with or without a solvent diluent. Diluents can be used to control viscosity, improve handling characteristics and/or add bulk for convenient volumes. For example, an organic solvent can be used for the modified polyamine resin. Modified polyamine resins are alcohol soluble; thus, a hydroxylic solvent can be used as a primary solvent. These include ethyl alcohol, isopropyl alcohol, butyl alcohol, 2-butoxy ethanol, monoethyl ether of diethylene glycol, ethylene glycol of monobutyl ether (known as butyl cellosolve), tetrahydrofuryl alcohol, and the like. A secondary solvent can also be used, including aliphatic, naphthenic and aromatic hydrocarbons, ethers, esters, ketones such as ethylene glycol monoethyl ether, oxylene, dioxane, ethyl acetate, isopropyl acetate, butyl acetate, amyl acetate, acetone, methyl ethyl ketone, methyl isobutyl ketone, hexane, heptane, octane, methyl cyclohexane, and the like. Preferably at least 5% by weight organic solvent for the modified polyamine resin is used for viscosity control.

Suitable solvents for the epoxy resin include mixtures of polar and non-polar solvents, such as a ketone and a hydrocarbon. Esters, alcohols, and ethers can be substituted for the hydrocarbon. Typical ketones which can be used include methyl ethyl ketone, methyl isobutyl ketone, diisobutyl ketone, and the like. Other solvents which can be used include xylene, acetone, dibutylsulfate, nonylphenol, and the like. Combinations of solvents can be used.

In water-based systems according to the present invention, water is the principal diluent in reducing the viscosity of the coating composition for application. Therefore, only small quantities, if any, of the organic solvents are used. Preferably the amount of organic solvent used is sufficiently low that the coating composition as applied has a volatile organic content of less than 450 grams per liter, and more preferably less than 350 grams per liter, to meet air pollution regulations.

The coating compositions of the present invention can be provided in formulations which produce a clear coating, a high gloss coating, a pigmented coating, or a coating suitable as a primer. The compositions can use reaction accelerators and inert, finely divided solids.

Suitable finely divided inert solid materials include fillers, such as asbestos, albality, silica, mica, flint powder, quartz, cryolite, Portland cement, limestone, atomized alumina, barytes, talc, zinc powder, pyrophyllite, various clays, diatomaceous earth, and other like materials. Pigments, such as titanium dioxide; cadmium red; carbon black; alumninum powder; and the like also can be used.

Suitable anticorrosive pigments can be added. Typical of these are zinc powder, zinc oxide, red lead, basic lead silica chromate, basic zinc chromate, zinc, lead, barium and strontium chromates, calcium plumbate, barium metaborate, and calcium, strontium and zinc molybdates.

Suitable other colorants can be added. Typical of these are: National Fast Red (National Aniline); Calco Condensation Blue (American Cyanamid); Bismark Brown (National Aniline); Blue Lake (13% Ponsal Blue, 10% aluminum hydrate and 77% blanc fixe), Krebs BP01790D, Blue Lake Krebs BP-258-D. Lithol Tower, Chrome Yellow, Iron Blue, Milari Blue, Monastral Green, Maroon Toner, Chrome Green, Chrome Orange, Iron Oxide Reds, Aluminum Powder, and flatting agents like diatomaceous silican and silica aerogel can be used. The color materials should be selected, however, so as to be non-reactive with the epoxy and modified polyamine resins and other ingredients as otherwise this might cause poor storage stability.

The finely divided inert solid materials suitable for use herein may have an average particle size ranging between about 50 mesh and 400 mesh, and preferably between about 100 and 400 mesh (U.S. Std. Series). The TABLE 1-continued

|  | EXAMPLE | | | | | | | | | | | | | |
|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 |
| Versamid 115 | 305 | 305 | 305 | 305 | 178 | 305 | — | — | — | — | — | 400 | 400 | — |
| Versamid 125 | — | — | — | — | — | — | — | — | 260 | — | — | — | — | — |
| Versamid 140 | — | — | — | — | — | — | — | — | — | 246 | — | — | — | — |
| Versamid 280-B75 | — | — | — | — | — | — | — | — | — | — | 340 | — | — | — |
| Versamid 100 | — | — | — | — | — | — | 600 | 600 | — | — | — | — | — | — |
| Butyl Cellosolve | 110 | 110 | 110 | 110 | 127 | 110 | 195 | 195 | 114 | 113 | 35 | 135 | 133 | 75 |
| Xylene | — | — | — | — | — | — | — | — | — | — | — | — | 108 | — |
| NITROPARAFFIN |  |  |  |  |  |  |  |  |  |  |  |  |  |  |
| 2-nitropropane | + | — | — | — | + | + | + | + | + | + | + | + | + | + |
| 1-nitropropane | — | + | — | — | — | — | — | — | — | — | — | — | — | — |
| Nitroethane | — | — | + | — | — | — | — | — | — | — | — | — | — | — |
| Nitromethane | — | — | — | + | — | — | — | — | — | — | — | — | — | — |

| EXAMPLE # | NITROPARAFFIN[h] (phr) | WATER ADDED (pbw) | 60° GLOSS | PENCIL HARDNESS | | MEK RUB | |
|---|---|---|---|---|---|---|---|
|  |  |  |  | OVERNIGHT | DAY | OVERNIGHT | 7 DAYS |
| 1A | 0 | NA[c] | — | — | — | — | — |
| 1B | 5 | 1600 | 47 | B | F | 5 | 90 |
| 1C | 10 | 2800 | 82 | B | F | 15 | 100+ |
| 1D | 20 | 2400 | 75 | B | F | 10 | 100+ |
| 1E | 40 | 2800 | 60 | B | F | 8 | 35 |
| 2A | 0 | NA | — | — | — | — | — |
| 2B | 5 | 2600 | 65 | HB | F | 3 | 50 |
| 2C | 10 | 3000 | 77 | HB | F | 4 | 50 |
| 2D | 20 | 3000 | 80 | HB | F | 6 | 65 |
| 2E | 40 | 2000 | 89 | HB | F | 8 | 85 |
| 3A | 1 | NA | — | — | — | — | — |
| 3B | 5 | 2600 | 61 | HB | F | 6 | 65 |
| 3C | 10 | 3400 | 77 | HB | F | 5 | 60 |
| 3D | 20 | 2000 | 75 | HB | F | 8 | 70 |
| 3 | 40 | 1400 | 75 | HB | F | 14 | 55 |
| 4A | 0 | NA | — | — | — | 13 | — |
| 4B | 5 | 2000 | 65 | B | F | <5 | 30 |
| 4C | 10 | 2800 | 75 | B | F | <5 | 45 |
| 4D | 20 | 3400 | 79 | HB | F | 6 | 60 |
| 4E | 40 | 3000 | 78 | HB | F | 5 | 55 |
| 5A | 0 | NA | — | — | — | — | — |
| 5B | 10 | 1200 | (d) | — | — | — | — |
| 5C | 20 | 1200 | 87 | B | F | <5 | 24 |
| 5D | 40 | 1200 | 89 | B | F | <5 | 25 |
| 6A | 0 | NA | — | — | — | — | — |
| 6B | 5 | 1600 | 63 | 2B | F | 6 | 20 |
| 6C | 10 | 2800 | 57 | 2B | F | 6 | 20 |
| 6D | 20 | 2800 | 68 | 2B | F | 5 | 20 |
| 7A | 0 | NA | — | — | — | — | — |
| 7B | 1 | 1200 | (d) | — | — | — | — |
| 7C | 2 | 1200 | 95 | 2B | F | <5 | 60 |
| 7D | 4 | 2400 | 90 | 2B | F | <5 | 25 |
| 7E | 8 | 3600 | 83 | B | F | <5 | 25 |
| 8A | 0 | NA | — | — | — | — | — |
| 8B | 1 | 800 | 93 | 2B | F | 5 | 30 |
| 8C | 2 | 800 | 95 | 2B | F | 5 | 25 |
| 8D | 4 | 1600 | 95 | B | F | 5 | 25 |
| 8E | 8 | 2800 | 95 | HB | F | 5 | 27 |
| 9A | 0 | NA | — | — | — | — | — |
| 9B | 5 | 2400 | gell[e] | B | F | 5 | 45 |
| 9C | 10 | 2400 | 25[e] | B | F | 6 | 50 |
| 9D | 20 | 2000 | 52[e] | B | F | 5 | 40 |
| 10A | 0 | NA | — | — | — | — | — |
| 10B | 5 | 1800 | gell[e] | B | HB | <5 | 30 |
| 10C | 10 | 1200 | gell[e] | B | HB | <5 | 30 |
| 10D | 20 | 1000 | 76[e] | B | HB | <5 | 45 |
| 11A | 0 | NA | — | — | — | — | — |
| 11B | 5 | 1200 | 90 | B | F | 12 | 100+ |
| 11C | 10 | 1200 | 89 | B | F | 15 | 100+ |
| 11D | 20 | 1200 | 85 | B | F | 14 | 100+ |
| 12 | 20 | 2400 | — | HB | F | 15 | 60 |
| 13 | 20 | 2400 | 96 | B | F | 15 | 60 |
| 14A | 0 | NA | — | — | — | — | — |
| 14B | 5 | 1200 | 96 | B | HB | 10 | 50 |
| 14C | 10 | 900 | 98 | B | HB | 12 | 100 |

| EXAMPLE # | NITROPARAFFIN[b] (phr) | WATER ADDED (pbw) | 60° GLOSS | PENCIL HARDNESS OVERNIGHT | DAY | MEK RUB OVERNIGHT | 7 DAYS |
|---|---|---|---|---|---|---|---|
| 14D | 20 | 900 | 96 | B | HB | 16 | 110 |

[b]phr = parts nitroparaffin per one-hundred parts polyamide resin.
[c]NA = does not accept water.
[d]Poor film properties.
[e]3 hours.

What is claimed is:

1. A kit for forming a coating comprising (a) a first container modified polyamine resin, the modified polyamine resin being inherently insoluble and non-dispersible in water, and (b) a second container containing (i) epoxy resin curable by the modified polyamine resin and (ii) sufficient nitroparaffin so that when the contents of the two containers are combined in about stoichiometric proportions to form a coating, water in an amount of at least 50% by weight of the modified polyamine resin can be added to the coating composition, both containers containing substantially no emulsifier, the nitroparaffin having the formula $C_nX_{2n+2}$ where n is an integer from 1 to 4 and each X is independently selected from the group consisting of chlorine, hydrogen, and $NO_2$, where at least one but no more than two X's are $NO_2$.

2. A kit for forming a coating comprising (A) a first container containing modified polyamine resin, the modified polyamine resin being inherently insoluble and non-dispersible in water, the modified polyamine resin being a polyamide-epoxy adduct formed by reacting a poly-amino-imidazoline and diglycidyl ether of bisphenol A, and (B) a second container containing (i) epoxy resin curable by the modified polyamine resin and (ii) sufficient nitroparaffin that when the contents of the two containers are combined in about stoichiometric proportions to form a coating, water in an amount of at least 50% by weight of the polyamide resin can be added to the coating composition, both contaminants containing substantially no emulsifier, the nitroparaffin having the formula $C_nX_{2n+2}$ where n is an integer from 1 to 4 and each X is independently selected from the group consisting of chlorine, hydrogen, and $NO_2$, where at least one but no more than two X's are $NO_2$.

3. The kit of claim 1 or 2 in which the nitroparaffin is selected from the group consisting of nitromethane, nitroethane, 1-nitropropane, 2-nitropropane, 1-nitrobutane, 2-nitrobutane, and combinations thereof.

4. The kit of claim 3 in which the nitroparaffin is 2-nitropropane.

5. The kit of claim 1 or 2 in which the nitroparaffin is nitroethane.

6. The kit of claim 1 or 2 in which the modified polyamine resin is inherently incapable of being homogeneously reduced by water.

7. The kit of claim 1 or 2 wherein when the contents of the two containers are combined in about stoichiometric proportions, the combination contains nitroparaffin in an amount of from about 2 to about 50% by weight of the modified polyamine resin.

8. The kit of claim 1 or 2 wherein when the contents of the two containers are combined in about stoichiometric proportions, the combination contains nitroparaffin in an amount of from about 15 to about 25% by weight of the modified polyamine resin.

9. The kit of claim 1 or 2 in which the modified polyamine resin has an amine value of less than about 400.

10. The kit of claim 1 or 2 wherein the second container contains organic solvent for the epoxy resin.

11. The kit of claim 1 or 2 wherein the first container contains organic solvent for the modified polyamine resin.

12. A kit for forming a coating comprising (a) a first container containing (i) modified polyamine resin and (ii) nitroparaffin in an amount of at least 2% by weight of the modified polyamine resin, the nitroparaffin having the formula $C_nX_{2n+2}$ where n is an integer from 1 to 4 and each is independently selected from the group consisting of chlorine, hydrogen, and $NO_2$, where at least one but no more than two X's are $NO_2$, the modified polyamine resin being inherently insoluble and non-dispersible in water, and (b) a second container containing epoxy resin curable by the modified polyamine resin, both containers containing substantially no emulsifier.

13. A kit for forming a coating comprising (A) a first container containing (i) modified poly-amine resin, the modified polyamine resin being inherently insoluble and non-dispersible in water, the modified polyamine resin being a polyamide-epoxy adduct formed by reacting a poly-amino-imidazoline and diglycidyl ether of bisphenol A, and (ii) nitroparaffin in an amount of at least 2% by weight of the modified polyamine resin, the nitroparaffin having the formula $C_nX_{2n+2}$ where n is an integer from 1 to 4 and each X is independently selected from the group consisting of chlorine, hydrogen, and $NO_2$, where at least one but no more than two X's are $NO_2$, and (B) a second container containing epoxy resin curable by the modified polyamine resin, both containers containing substantially no emulsifier.

14. A method for forming a coating on a substrate comprising the steps of (a) combining contents of the first container of the kit of claim 1, contents of the second container of the kit of claim 1 in such an amount that the epoxy resin can be cured, and water in an amount at least equal to 50% by weight of the modified polyamine resin, and (b) applying the combination to the substrate.

15. A method for forming a coating on a substrate comprising steps of (a) combining contents of the first container of the kit of claim 2, contents of the second container of the kit of claim 50 in such amounts that the epoxy resin can be cured, and water in an amount at least equal to 50% by weight of the modified polyamine resin, and (b) applying the combination to the substrate.

16. The method of claim 14, or 15 in which the step of combining comprises mixing contents of the first container with contents of the second container and adding water to the mixture.

17. The method of claim 14, or 15 in which the step of combining comprises mixing water with contents of the second container and adding contents of the first container to the mixture.

18. A method for coating a substrate comprising the steps of mixing contents of the first container of the kit of claim 12 with water in an amount of at least about 50% by weight of the modified polyamine resin and combining the mixture with contents of the second container of the kit of claim 12 in about stoichiometric proportions.

19. A method for coating a substrate comprising the steps of mixing contents of the first container of the kit of claim 13 with water in an amount of at least about 50% by weight of the modified polyamine resin and combining the mixture with contents of the second container of the kit of claim 13 in about stoichiometric proportions.

20. The kit of claim 1 wherein the volatile organic content of each container is sufficiently low that when the contents of the two containers are combined in about stoichiometric proportions to form a coating composition, the coating composition has a volatile organic content of no more than 450 grams per liter.

21. The kit of claim 2 wherein the volatile organic content of each container is sufficiently low that when the contents of the two containers are combined in about stoichiometric proportions to form a coating composition, the coating composition has a volatile organic content of no more than 450 grams per liter.

22. The kit of claim 12 wherein the volatile organic content of each container is sufficiently low that when the contents of the two containers are combined in about stoichiometric proportions to form a coating composition, the coating composition has a volatile organic content of no more than 450 grams per liter.

23. The kit of claim 13 wherein the volatile organic content of each container is sufficiently low that when the contents of the two containers are combined in about stoichiometric proportions to form a coating composition, the coating composition has a volatile organic content of no more than 450 grams per liter.

24. The kit of claim 1 or 12 wherein the modified polyamine resin is selected from the group consisting of (a) polyamine-epoxy adducts, (b) polyamides resulting from the reaction of polyamines and carboxylic acids selected from the group consisting of monocarboxylic acids, poly-carboxylic acids, and combinations thereof where less than about 75% by weight of the carboxylic acids reacted with the polyamines are dicarboxylic acids having 10 or less carbon atoms, (c) polyamide-epoxy adducts, and (d) combinations thereof.

25. The kit of claim 1 or 12 wherein both containers contain substantially no emulsifier.

26. The kit of claim 12 or 13 in which the nitroparaffin is nitroethane.

27. The kit of claim 12 or 13 wherein when the contents of the two containers are combined in about stoichiometric proportions, the combination contains nitroparaffin in an amount of from about 2 to about 50% by weight of the modified polyamine resin.

28. The kit of claim 12 or 13 wherein when the contents of the two containers are combined in about stoichiometric proportions, the combination contains nitroparaffin in an amount of from about 15 to about 25% by weight of the modified polyamine resin.

29. The kit of claim 12 or 13 in which the modified polyamine resin has an amine value of less than about 400.

30. A method for forming a coating on a substrate comprising the steps of (a) selecting the kit of claim 20, 21 or 23, (b) combining contents of the first container of the selected kit, contents of the second container of the selected kit in such amounts that the epoxy resin can be cured, and water in an amount at least equal to 50% by weight of the modified polyamine resin, and (c) applying the combination to the substrate.

31. A method for coating a substrate comprising the steps of (a) selecting the kit of claim 12 or 13, (b) mixing contents of the first container of the selected kit with water in an amount of at least about 50% by weight of the modified polyamine resin, and (c) combining the mixture formed in step (b) with contents of the second container of the selected kit in about stoichiometric properties, and (d) applying the combination formed in step (c) to the substrate.

32. The coated substrate prepared by the method of claim 14, 15, 18 or 19.

* * * * *